United States Patent
Haley et al.

[11] Patent Number: 5,180,339
[45] Date of Patent: Jan. 19, 1993

[54] DOUBLE ACTING SECONDARY SHEAVE SERVO FOR A CONTINUOUSLY VARIABLE TRANSMISSION

[75] Inventors: William J. Haley, Ithaca; Glenn E. Swanson, Lansing, both of N.Y.

[73] Assignee: Borg-Warner Automotive, Inc., Sterling Heights, Mich.

[21] Appl. No.: 748,695

[22] Filed: Aug. 22, 1991

Related U.S. Application Data

[62] Division of Ser. No. 721,285, Jun. 26, 1991.

[51] Int. Cl.⁵ ............................................. F16H 59/00
[52] U.S. Cl. .................................................. 474/28
[58] Field of Search .............. 474/8, 17, 18, 25, 28, 474/29; 74/867, 868

[56] References Cited

U.S. PATENT DOCUMENTS

| | | |
|---|---|---|
| 4,522,086 | 6/1985 | Haley . |
| 4,674,363 | 6/1987 | Miyawaki . |
| 4,702,725 | 10/1987 | Kouno et al. . |
| 4,722,718 | 2/1988 | Eugen .................... 474/19 |
| 4,753,627 | 6/1988 | Kawamoto .............. 74/867 X |
| 4,767,384 | 8/1988 | Moan ...................... 74/868 X |
| 4,982,822 | 1/1991 | Petzold et al. . |
| 5,006,092 | 4/1991 | Neuman et al. . |

*Primary Examiner*—Ramon S. Britts
*Assistant Examiner*—Roger J. Schoeppel
*Attorney, Agent, or Firm*—Willian Brinks Olds

[57] ABSTRACT

A continuously variable transmission includes an improved secondary servo arrangement in order to provide the necessary clamping forces for high torque conditions. The secondary servo includes a plurality of fluid chambers in order to allow an increase in the area for application of fluid pressure. Fluid conduits between the chambers permit communication of the fluid to the chambers to regulate the clamping force of the movable sheaves of the secondary variable pulleys.

8 Claims, 6 Drawing Sheets

DOUBLE ACTING SECONDARY SHEAVE SERVO FOR A CONTINUOUSLY VARIABLE TRANSMISSION

This is a division of application Ser. No. 721,285, filed Jun. 26, 1991.

BACKGROUND OF THE INVENTION

1. Field of the Invention

This invention relates to continuously variable transmissions having a primary variable pulley system and a secondary variable pulley system to control the transmission ratio between the input and output shafts. More particularly, this invention relates to a double acting servo of the secondary variable pulley system of a continuously variable transmission which provides greater clamping forces at lower transmission ratios.

2. Description of the Prior Art

A continuously variable transmission (CVT) utilizes a pair of adjustable or variable pulleys mounted on a pair of shafts, and an endless belt intercoupled therebetween, to transmit torque from an input source, such as an engine, to an output, such as a vehicle driveline. Each pulley has at least one sheave that is axially fixed and another sheave that is axially movable relative to the first. A flexible belt of metal or elastomeric material interconnects the pulleys.

The inner faces of the sheaves of the pulleys are bevelled or chamfered so that movement of the axially displaceable sheave relative to the fixed sheave adjusts the distance between the sheaves and, thus, the effective pulley diameter. The first pulley, or primary pulley, is mounted on a primary or input shaft and is directly driven by the engine, or is driven by the engine through a torque converter, fluid coupling or start clutch. The second pulley, or secondary pulley, is mounted on a secondary or output shaft and the output of the secondary shaft drives the drivetrain of the vehicle. The drive train may be connected to the secondary shaft through a clutch. U.S. Pat. No. 4,433,594, entitled "Variable Pulley Transmission", provides further information regarding CVTs and is incorporated herein by reference in terms of background to the present invention.

The primary and secondary variable pulley systems include servo systems for movement of the pulley sheaves. The displaceable sheave of each pulley includes an annular chamber for receiving fluid to move the sheave and thus change the effective pulley diameter. Increasing the fluid in the chamber increases the effective diameter of the pulley. A fluid is exhausted from the chamber, the pulley diameter is decreased. The effective diameter of the primary pulley is moved in one direction as the effective diameter of the secondary pulley is moved in the other direction.

The movement of the sheave of the primary pulley servo regulates the transmission ratio across the CVT. The movement of the sheave of the secondary pulley servo regulates the clamping force on the belt connecting the primary and secondary pulleys. Sufficient clamping force is necessary to prevent damage that might result from slippage of the belt. The present invention is directed primarily to providing sufficient clamping force at the secondary pulley servo to prevent belt slippage.

The provision of sufficient clamping force to the secondary sheave becomes especially difficult in high torque applications. In such applications, certain designs of conventional CVT's may not be sufficient to supply the necessary range of vehicle drive ratios or a sufficient amount of output torque. For example, in a motor vehicle transmission, a single two-sheave CVT may not be capable of accomplishing all four of the following objectives: (a) providing the high torque necessary or desirable to optimally launch the vehicle from a stationary position without causing the belt to slip on the secondary sheave, particularly when the vehicle is facing up a steep incline or pulling a trailer; (b) providing a low enough transmission ratio to deliver a sufficiently high starting torque to allow the vehicle to move very slowly at a practical engine speed; (c) providing a high enough transmission ratio that the vehicle can travel efficiently at a high rate, as on an interstate highway; and (d) counteracting the undesired centrifugal pressure increase in the rotating hydraulic sheave cylinders which is observed at high speeds. These factors are explained in more detail below.

The need for high wheel torque, or a low starting transmission ratio, at launch, is complicated by the low torque supplied by the engine at low engine speeds. To maximize the launching torque supplied by the engine, the torque from the engine must be multiplied at low speeds by inserting a conventional torque converter between the engine output and CVT input. Alternatively, the CVT transmission ratio must be excessively low at low speeds, which consequently limits the upper limit of the high-speed transmission ratio.

The use of a torque converter overcomes these low torque and low-speed transmission ratio problems without compromising the high ratio. The torque converter has no multiplication effect on the input or output torque at high ratios, as the torque converter is effectively locked up at high ratios. In certain applications, the output of the CVT alone may not be adequate to provide sufficient launch of the vehicle. Unfortunately, the torque multiplication provided by the torque converter increases the secondary clamping force required to prevent the belt from slipping.

The output torque of the CVT and the effective diameter of the primary sheave thus determine the necessary clamping force at the secondary sheave to prevent slipping of the belt. At vehicle launch, a higher output torque necessitates a higher clamping force. Moreover, at vehicle launch, the effective diameter of the primary sheave is at its smallest position. Therefore, the required secondary servo clamping force is highest at launch. To increase the force at the secondary servo, the area of the servo chamber for force application can be increased, or the pressure of the fluid applied to the chamber can be increased.

An important consideration in sizing the secondary servo for the increased clamping force required at low ratios, is the effect of the design on the centrifugal forces generated by the oil rotating with the servo. The centrifugal force generated by the oil increases with the square of the angular velocity of the sheave and the fourth power of the sheave radius. The centrifugal force of the oil on the sheave servo acts to increase the clamping force on the belt and can cause excessive clamping forces at high secondary angular velocities.

The traditional method of minimizing the negative effects of the centrifugal oil pressure is to centrifugally balance the servo. This is typically accomplished by using a single secondary with a balance can adjacent to the servo to provide a counteracting centrifugal force. This can is kept filled with oil either through an orifice in the apply servo or from an external source. The can is typically open to atmosphere and only acts to reduce the belt clamping force through the centrifugal force of the oil contained within its volume.

High secondary forces due to centrifugal effects not only cause excessively high clamping forces on the belt which contribute to transmission inefficiency; such forces can make it difficult or impossible to obtain the required primary to secondary belt clamping force ratio necessary to maintain a desired ratio. Thus, if the force on the secondary is at a high level, the force on the primary must be that much higher to obtain the necessary force ratio.

Increased clamping force can be obtained by increasing the pressure of the hydraulic fluid. Since the hydraulic fluid of the secondary servo is pressurized by a pump, the fluid to the servo can be supplied at a very high pressure during launch to provide the necessary clamping force. The fluid pressure can then be moderated at higher angular velocities, particularly as the fluid becomes self-pressurized by centrifugal force.

Unfortunately, this solution is not practical in some applications. First, the pump size must be impractically large to produce a pressure of sufficient magnitude to provide the necessary clamping force at launch to a servo piston of moderate diameter. Second, even if a suitable pump is provided, the pressure which can be delivered to the servo is limited by the pressure capacity of the seals of the secondary shaft. Moreover, in a CVT which utilizes a torque converter, the diameter of a single secondary servo that is necessary to obtain the required apply area to operate with reasonable pressures is so large as to cause centrifugal problems.

The present invention is an attempt to provide a CVT capable of supplying a high output torque at launch while overcoming the above-described problems. While CVTs with double-acting primary servos are known in the prior art, the present invention utilizes a double-acting secondary servo in an attempt to address the above-described problems.

SUMMARY OF THE INVENTION

The present invention is directed to a continuously variable transmission with an improved secondary servo arrangement in order to provide sufficient clamping forces under high torque conditions. The present invention provides a plurality of fluid chambers in order to allow an increase in the area for application of fluid pressure. Fluid conduits between the chambers permit communication of the fluid to the chambers to regulate the position of the movable sheaves of the variable pulleys.

The present invention utilizes a secondary with two servo areas and a balance cavity between the servo areas. This arrangement allows the required force ratios necessary to operate the CVT without a completely centrifugally balanced secondary.

In one embodiment, primary sheave pressure is supplied directly to the balance cavity. As the primary pressure increases, fluid is supplied to the balance cavity to counteract the forces in the two secondary servo apply areas. In another embodiment, constant pressure is supplied to the balance cavity. A valve controls the application of fluid pressure to the balance cavity to reduce the secondary clamping force.

Thus, in accordance with one embodiment of this invention, a continuously variable transmission system is provided to allow the transmission of torque from a torque input means to a torque output means. The transmission includes rotatable input and output shafts and drive means for drivingly coupling the input shaft with the output shaft. The drive means includes a first variable pulley means rotatable with the input shaft, a second variable pulley means rotatable with the output shaft, and an endless chain or belt coupling the first and second variable pulleys.

Each of the first and second variable pulleys has a fixed and a movable sheave, as well as biasing means for continuously biasing together the fixed and movable sheaves of each variable pulley. The biasing means for the second variable pulley includes a plurality of fluid chambers having fluid access to a source of pressurized hydraulic fluid. By the addition and exhaustion of fluid from the fluid chambers, relative movement is permitted between the sheaves. The movable sheave of the second variable pulley is operatively positioned for movement from a first position to a second position, which movement corresponds to movement from a position proximate to the fixed sheave to a position distal from the fixed sheave of the second variable pulley.

In one embodiment, the first and third fluid chamber comprise the secondary servo apply areas. The second fluid chamber comprises the balance cavity. The second chamber is connected to the balance can. The first fluid chamber is in direct fluid communication with the transmission hydraulic fluid source by means of a conduit. A fluid conduit, when the movable sheave is located in the first position, is effective to permit communication of fluid between the first chamber and the third chamber through the conduit. When the movable sheave is positioned in the second position, that same conduit permits communication of fluid between the second chamber and the third chamber, but not the first and third chambers.

The first chamber has a first interior surface which is integral with the fixed sheave and a second interior surface which is integral with the movable sheave. Translation of the movable sheave is effective to alter the available fluid volume of the first chamber by translation of the first and second interior surfaces. The second and third chambers each also have a first interior surface which is integral with the fixed sheave and a second interior surface which is integral with the movable sheave, where translation of the movable sheave is effective to alter the available fluid volume of each of the second and third chambers by translation of each of the first and second interior surfaces.

In an alternative embodiment, an additional conduit permits direct communication between the third chamber and the hydraulic fluid source. Positioning of the movable sheave in the second position can be effective to prohibit communication between the third chamber and the hydraulic fluid source through that conduit. A valve means may also be provided for regulation of fluid flow through the conduit.

In another alternative embodiment, primary pressure is piped directly to the second chamber or balance cavity of the secondary servo. At stall (lowest primary ratio) conditions, no pressure is fed to the primary. Thus, no pressure is fed to the balance cavity which allows the maximum clamping force on the secondary. As the ratio increases, and the torque converter is locked, fluid (oil) pressure is fed to the primary sheave to provide a CVT upshift. Thus, pressure is also fed to the balance cavity, which reduces the secondary clamping force. This provides an additional benefit when downshifting as the secondary clamping force increases as the primary pressure drops.

In another alternative embodiment, a constant fluid pressure is supplied to the second chamber or balance cavity. This constant pressure is controlled by a valve. When a decrease in the secondary clamping force is desired, the valve is opened and the balance cavity is supplied with constant pressure. The pressure in the balance cavity reacts against the pressure in the other two secondary cavities, thus reducing the clamping force. The balance cavity also serves as a centrifugal balance.

BRIEF DESCRIPTION OF THE DRAWINGS

For a more complete understanding of this invention, reference should now be made to the embodiments illustrated in greater detail in the accompanying drawings and described by way of example only. In the drawings.

DETAILED DESCRIPTION OF THE INVENTION

Figure 1:
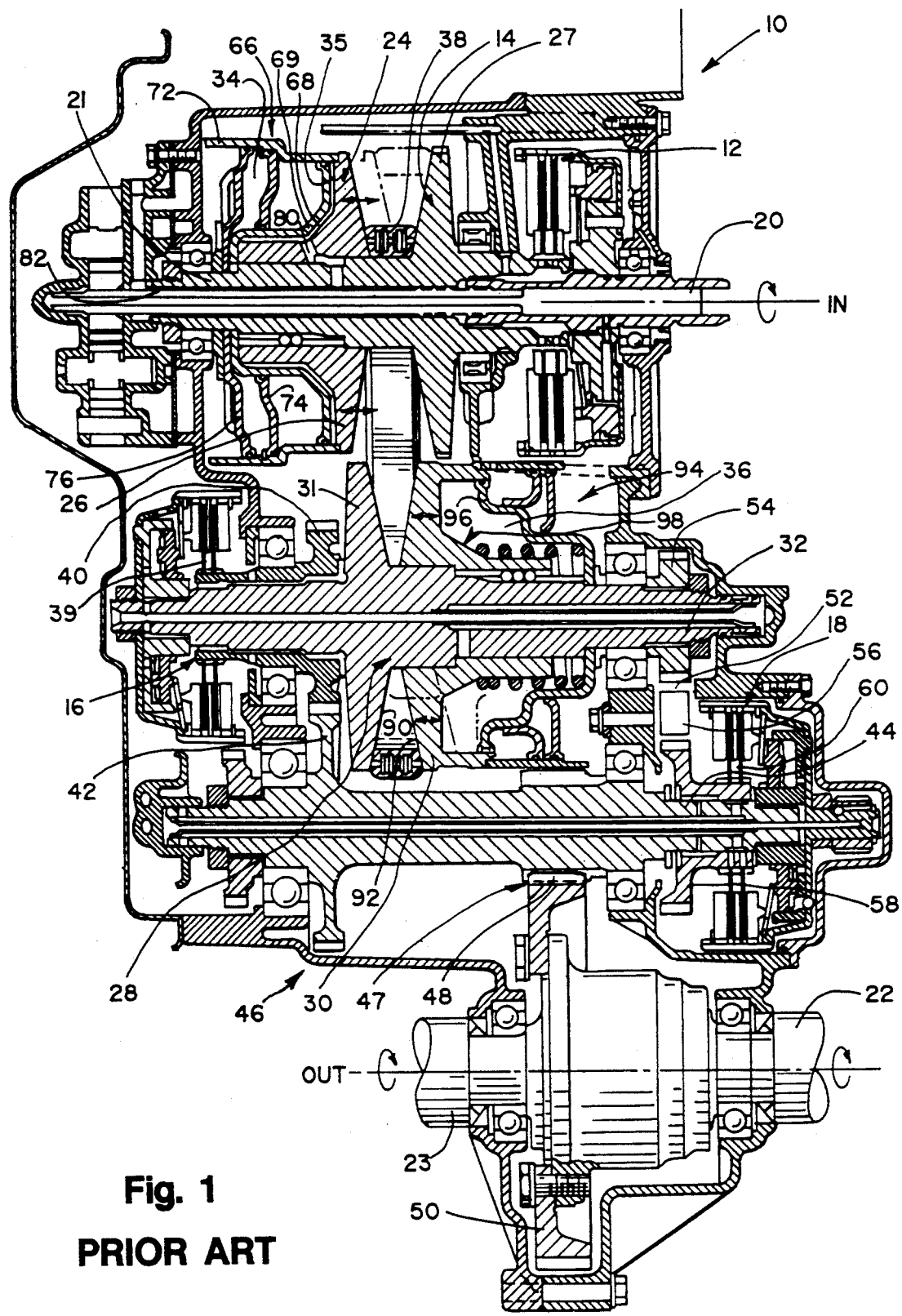
FIG. 1 is a sectional view of a conventional continuously variable transmission of the prior art, illustrating the environment of the present invention.

Turning now to the drawings, FIG. 1 illustrates a compact arrangement for a continuously variable transmission (CVT) known in the prior art. The details of the structure of this CVT are set forth in U.S. Pat. No. 5,006,092, which is incorporated herein by reference. The details of this conventional CVT will be described to the extent necessary to provide the environment for an understanding of the present invention.

The CVT is illustrated generally at 10 in FIG. 1, and it includes a slippable start clutch that is located upstream of a belt and sheave system 14. The slippable start clutch may be utilized in place of a torque converter. Non-dynamic forward and reverse clutches 16, 18 are situated downstream of the belt and sheave system. This system of clutches 12, 16, 18 may be included in the CVT, as desired, but does not form a part of the present invention.

The continuously variable transmission includes an input shaft 20 and a primary shaft 21 for the input of torque from the engine to the transmission and a pair of output shafts 22, 23 for the output of torque from the transmission to the vehicle drive wheels. A first variable pulley 24 having a first movable sheave 26 and a first fixed sheave 27 is disposed on the shaft 21. A second variable pulley 28 having a second movable sheave 30 and a second fixed sheave 31 is disposed on a secondary shaft 32. First servo chambers 34, 35 receive fluid to force movement of the first movable sheave 26 and a second servo chamber 36 receives fluid to force movement of the second movable sheave 30.

The first and second pulleys 24, 28 are coupled by an endless belt 38. The flexible belt can be of metal or elastomeric construction, as known in the art. Transmission belts suitable for use in CVT's are shown in U.S. Pat. Nos. 4,313,730 and 4,507,106, which also are hereby incorporated by reference.

The start clutch 12 is located between the input shaft 20 and the primary shaft 21. The start clutch acts to transmit torque from the shaft 20 to shaft 21. In the drawings, the start clutch is shown as a fluid-actuated slippable clutch, but it can also be a torque converter or other fluid coupling means or an electric particle clutch between the engine and the input shaft.

The ratio of the continuously variable transmission 10 is controlled by the pressure of the fluid supplied to the primary servo chambers 34, 35 and the secondary servo chamber 36. The pressure in the primary servo chambers 34, 35 moves the first movable sheave 26 to regulate the ratio between the shaft 21 and the secondary shaft 32. The pressure supplied to the second servo chamber 36 moves the second movable sheave to regulate the clamping force on the belt to prevent slippage. As described below, the present invention is primarily directed to the construction of the secondary servo chamber.

Downstream of the belt and sheave system 14, the forward clutch 16 is disposed on the secondary shaft 32 and the reverse clutch 18 is disposed on a countershaft 44. Engagement of the forward and reverse clutches causes, through a series of gear members, the transmission output shafts 22, 23 to rotate in forward and reverse directions. A forward gearing system 46, which includes a drive gear 40 and a driven gear 42, is coupled for rotation with the movable clutch plate 39 of the forward clutch 16. The countershaft 44 is coupled to the output shafts 22, 23 through an output gear system 47 that includes a drive gear 48 and a driven gear 50. A reverse gearing system 52, which includes a drive gear 54, and idler gear 56 and a driven gear 58, couples the countershaft to the movable clutch plate 60 of the reverse clutch 18. These features are detailed to provide the environment for the present invention.

FIG. 1 also illustrates the details of the conventional primary and secondary sheave servos. The primary sheave system, and particularly the movable sheave flange 24, has a double-acting primary servo generally indicated at 66 including a piston surface 68 and a reaction plate 69, joined by cylinder means. Substantially fluid tight annular cylinders 34, 35 are defined by the telescoping outer sleeve 72 and the inner plates 74, 76, the reaction plate 69, and the piston surface 68.

Hydraulic fluid is delivered to the cylinders 34, 35 and its pressure is regulated by a fluid supply system which communicates through port 80 to an external hydraulic fluid supply system (not shown). The port 80 communicates between the cylinders 34, 35 and the annular recess 82, which encircles the shaft 22. Thus, the rotating reservoir of the cylinders 34, 35 communicates with a stationary source of pressurized hydraulic fluid.

The secondary pulley 28 of the transmission shown in FIG. 1 is, for the most part, comparable to the primary pulley 24. The secondary pulley 28 includes sheave flanges 90 and 92. The surfaces of the sheave flanges 90, 92 define a groove of the secondary pulley 28 for location of the belt 38.

The secondary servo generally indicated at 94 controls the position of the movable sheave 30. The primary purpose of the secondary servo 94 is to provide a sufficient clamping force to prevent the belt 38 from slipping. The servo 94 comprises a hydraulic fluid cylinder 36 having an annular reservoir. The reservoir is defined and enclosed by an outer sleeve 96 and the piston surface 98. The reservoir communicates with a source of pressurized fluid.

FIG. 1 illustrates the variation of the transmission ratio of the CVT. In FIG. 1, the CVT is at its lowest ratio because the sheave 24 has essentially its minimum effective radius and the sheave 28 has effectively its maximum effective radius. The flanges of the sheave 24 set the desired ratio for the belt 38. The secondary sheave 28 provides the necessary tension in the belt 38 to prevent it from slipping on either sheave. The sheave 24 and input shaft 20 thus rotate much faster than the secondary sheave 28 and the secondary shaft 32. If a torque converter is used, it operates to multiply the torque provided from the engine to the input shaft 20.

The belt 38 of FIG. 1 is illustrated in phantom lines for the situation when the CVT has been "shifted" or varied by increasing the force between the flanges of the first sheave 24. This increases the effective radius of the sheave 24 by urging the belt 38 radially outward and to the right as shown in FIG. 1. This shift of the belt 38 on the primary sheave 24 draws the portion of the belt 30 trained on the secondary sheave 28 inward and to the right as shown in FIG. 1. The shift of the belt 38 pushes the surfaces 90 and 92 apart, opening the groove and thus reducing the effective radius of the secondary sheave 28. Meanwhile, the secondary servo 94 maintains a sufficient clamping force on the belt 38, applied at the surfaces 90 and 92, to prevent the belt 38 from slipping.

With this background of the basic operation of the CVT, the improvements comprising the present invention can be more readily explained. The present improvements relate to the secondary servo 94, and are illustrated in several embodiments in FIGS. 2 through 10.

Figure 2:
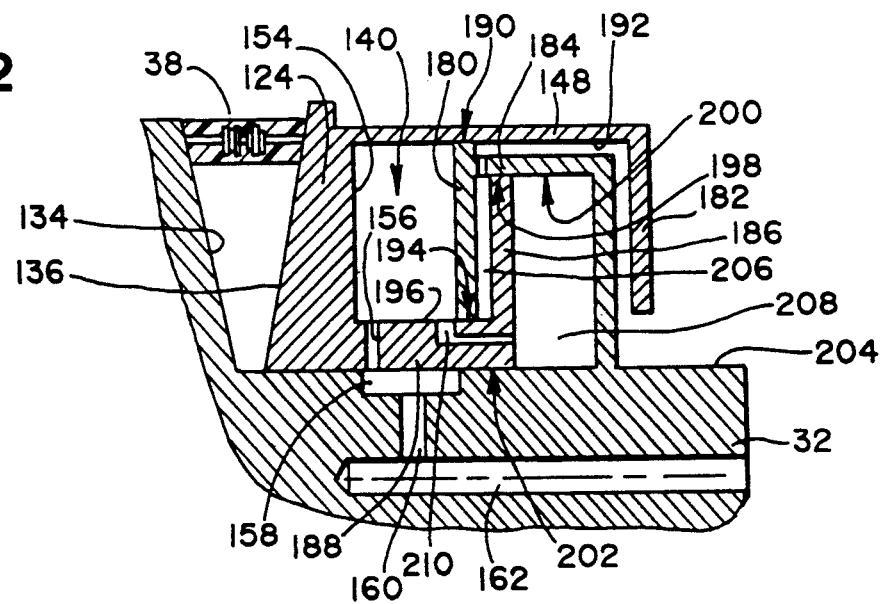
FIG. 2 is a schematic half-sectional detail view, taken through the center axis of the secondary sheave servo of one embodiment of the present invention, configured to provide its lowest transmission ratio.
Figure 3:
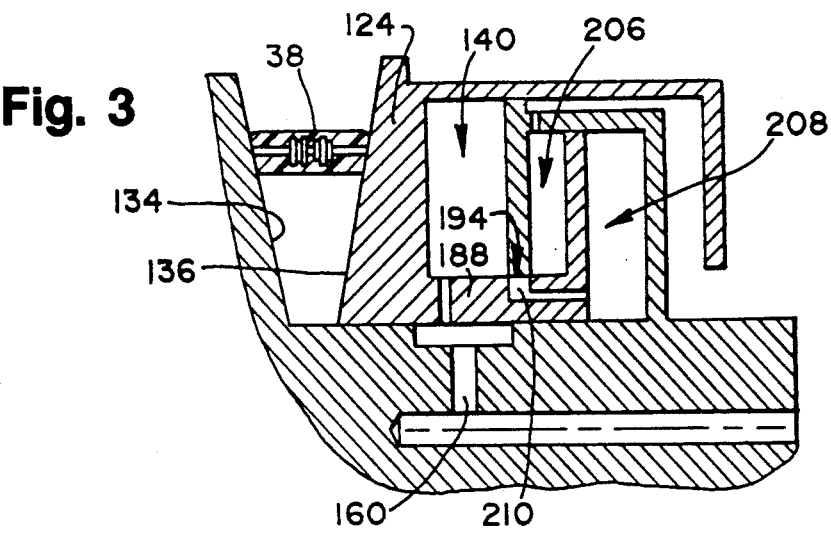
FIG. 3 is a view of the secondary servo of FIG. 2 configured to provide an intermediate transmission ratio.
Figure 4:
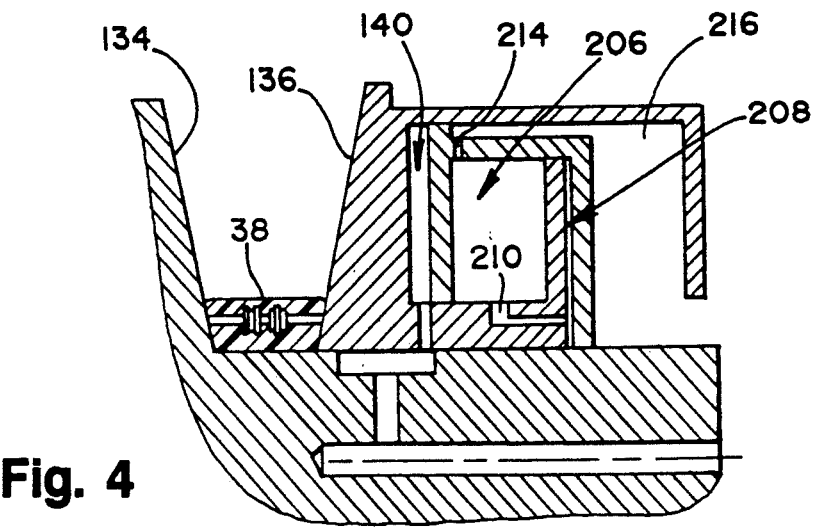
FIG. 4 is a view of the secondary servo of FIG. 2 configured to provide its highest transmission ratio.

FIGS. 2 through 4 show a first embodiment of the present invention. Here, the sheave flange 124 includes a piston surface 154 which defines part of a first fluid chamber 140. Fluid is inputted into the chamber 140 by means of a conduit comprising the port 156, the annular recess 158, the port 160, and the axial bore 162 of the secondary shaft, which is operatively connected to the hydraulic system. The axial dimension of the annular recess 158, when positioned with the port 156, causes the recess to remain in fluid communication with the port for all positions of the sheave flange 124. Fluid pressure within the first chamber 140 biases the piston surface 154, and thus the sheave surface 136, toward the surface 134. An outer sleeve 148 extending axially from the sheave flange 124 defines an upper portion of the chamber 140.

The embodiment of FIGS. 2 through 4 includes the axially fixed, axially spaced first and second reaction plates 180 and 182, which in this simplified embodiment are shown as integral with the secondary shaft. In this embodiment the reaction plates 180 and 182 are carried on the secondary shaft 32 on the same side of the secondary sheave as the piston surface 154. The reaction plates 180 and 182 are joined by an axially extending sleeve 184. The apparatus further comprises a piston plate 186, which here is a radial extension of the sleeve 188.

The first reaction plate 180 is axially fixed and has an upper periphery 190 along which the inner cylindrical surface 192 of the sleeve 148 is slidable axially in substantially sealed relation. The first reaction plate 180 has a lower periphery 194, with respect to which the outer cylindrical surface 196 is axially slidable in substantially sealed relation. Thus, the four surfaces of the piston surface 154, the first reaction plate 180, the inner cylindrical surface 192, and the outer cylindrical surface 196 define the reservoir of the first fluid chamber 140.

The piston plate 186 is axially movable, and has an upper periphery 198 which is slidable in substantially sealed relation to the inner cylindrical surface 200 of the sleeve 184. The piston plate 186 has an inner periphery 202 which merges with the inner periphery of the inner sleeve 188, and which is slidably engaged in a substantially sealed relation to the cylindrical outer surface 204 of the secondary shaft 32. The four surfaces of the reaction plate 180, the piston plate 186, the inner cylindrical surface 200, and the outer cylindrical surface 196 define the reservoir of a second fluid chamber 206.

The second reaction plate 182 is sealed to, and here shown as integral with, the sleeve 184 and the cylindrical outer surface 204 as previously defined. The piston plate 186, the reaction plate 182, and the outer cylindrical surface 204 and the inner cylindrical surface 200 define the reservoir of a third fluid chamber 208.

The inner sleeve 188 has a generally L-shaped conduit 210, having a radially extending leg and an axially extending leg, which transfers fluid from the third chamber 208 to the first chamber 140 under certain circumstances, and to the second chamber in other circumstances. Fluid passes from second chamber 206, through outlet port 214, into the balance can 216. These circumstances are illustrated in FIGS. 2, 3, and 4.

In FIG. 2, the effective radius of the secondary pulley is near its maximum, so the belt 38 is near the outside of the groove between the inner surfaces 134 and 136. Thus, the sheave flange 124 is fully displaced axially to the left in FIG. 2 so that the surface 136 is near its closest proximal point to the surface 134. At the same time, the conduit 210 provides a fluid connection between the first chamber 140 and the third chamber 208. Thus, fluid is delivered to the chambers 140 and 208 simultaneously, at nearly equal pressures (apart from the slight pressure drop through the port 210), from the hydraulic system by means of the described porting.

The clamping force urging the sheave flange 124 to the left (as shown in FIG. 2) includes the pressure generated by fluid in the first chamber 140 and the third chamber 208, which comprise the pressure apply areas. The magnitude of the clamping force is determined by the fluid pressure and the combined annular areas of the piston surface 154 and the piston plate 186. Thus, in the secondary servo shown in FIG. 2, roughly twice as much clamping force is applied to the sheave flange 124 as would be applied merely by directing a fluid under pressure into the first chamber 140. As FIG. 2 illustrates, a large clamping force is exerted by the pressure apply areas of the first and third fluid chambers on the sheave flange 124 at this low-ratio limit to prevent the belt 38 from slipping between the surfaces 134 and 136.

FIG. 3 shows the sheave flange 124 shifted axially to an intermediate position (between those shown in FIGS. 2 and 4). The belt 38 has moved radially inward between the surfaces 134 and 136 to remain in engagement with them, so the transmission has a higher ratio than in FIG. 2. As shown in FIG. 3, the radial port 210 is beneath the inner periphery 194 of the first reaction plate 180, and thus, has closed the conduit between the first cylinder 140 and the third chamber 208. In this position, fluid remains within the chamber 208, but it is isolated from communication with the first chamber 140.

As the sheave 124, and thus the sleeve 188, shifts further distally, as shown in FIG. 4, the second and third chambers 206 and 208 are brought into communication by the conduit 210. The hydraulic fluid in the third chamber 208 thus is directed into the second chamber 206, or balance cavity. Fluid is removed from the second chamber by the port 214 to fill the centrifugal balance can 216 and, when it overflows the balance can, it is returned to a sump (not shown) for reuse. Fluid which remains in the second chamber also acts as a centrifugal balance.

The externally-applied fluid pressure in the second and third chambers 206 and 208 is unpressurized when the sheave flange 124 is at or near its high-ratio or distal limit of axial travel, as illustrated in FIG. 4. The first chamber 140 then acts alone to provide a clamping force on the belt 38. However, centrifugal pressure is still present in the second and third chambers on account of the rotating oil.

When the transmission is at its low-ratio limit, as illustrated in FIG. 2, essentially zero fluid apply pressure is applied in the second chamber 206 (due to the escape of hydraulic fluid through the port 214) and the fluid pressures in the chambers 140 and 208 are substantial. Thus, fluid control means is provided for reducing the pressure in the third chamber 208 relative to the pressure in the second chamber 206 when the sheave flange 124 is shifting toward its high ratio limit shown in FIG. 4. As a result, in the apparatus of FIGS. 2 through 4, a substantially greater clamping force is applied (for a given fluid pressure) in the low-ratio configuration of FIG. 2 than in the high-ratio configuration of FIG. 4.

During high-ratio operation of the CVT, the externally applied or nominal fluid pressure is not the only fluid pressure exerted in the high-ratio configuration of FIG. 4. The centrifugal force in the rotating hydraulic fluid in the chambers 140, 206, and 208 increases with the rate of rotation of the shaft of the secondary sheave 28. The centrifugal effect of chamber 206 is intended to cancel the effect of chamber 208. Similarly, the balance can 216 is intended to cancel the centrifugal effect of chamber 140.

The clamping force applied in FIGS. 2 through 4 is a force tending to shift or bias the sheave flange 124 to the left, but FIGS. 2-4 show that the sheave flange 124 actually shifts to the right as the speed of the secondary shaft 32 increases. The sheave 124 actually follows the belt 38, instead of the reverse relation. Thus, the pressure conveyed to the first and third chambers 140 and 208 counteracts the shifting of the sheave flange 124, rather than driving it.

Figure 5:
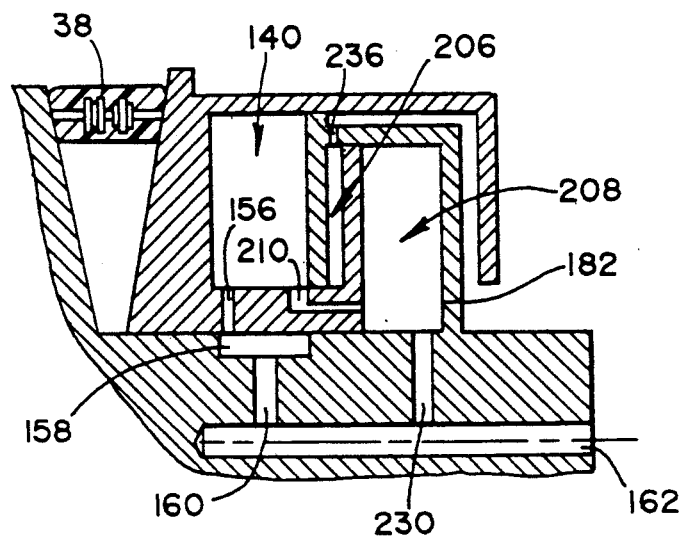
FIG. 5 is a schematic half-sectional detail view, taken through the center axis of the secondary sheave servo of an alternative embodiment of the present invention, configured to provide its lowest transmission ratio.
Figure 6:
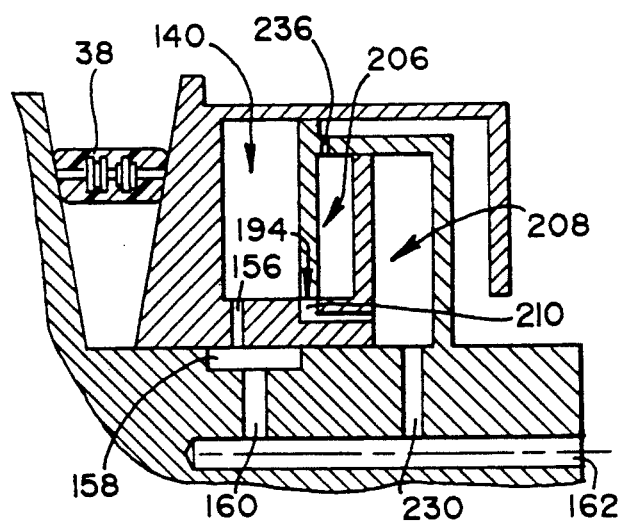
FIG. 6 is a view of the secondary servo of FIG. 5 configured to provide an intermediate transmission ratio.
Figure 7:
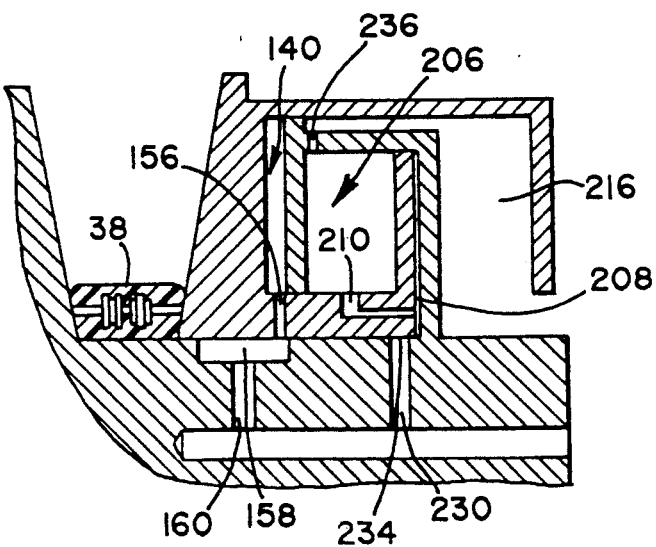
FIG. 7 is a view of the secondary servo of FIG. 5 configured to provide its highest transmission ratio.

FIGS. 5 through 7 show another embodiment of the present invention. The fundamental difference between the embodiment of FIGS. 5 through 7 and that of FIGS. 2 through 4 is the provision in FIGS. 5 through 7 of a radial port 230 communicating between the bore 162 and the third chamber 208. The embodiment of FIG. 5 functions in essentially the same way as the embodiment of FIG. 2, except that there are two means of communication between the first and third chambers 140, 208, as illustrated in FIG. 6, in order to keep the chambers filled with fluid. As with the embodiment of FIG. 2, the port 210 provides such communication. However, a parallel path of fluid communication is provided by the ports 230 and 160, the recess 158 and the radial port 156. The port 236 vents the second chamber 206 to the balance can. When the balance can overflows, the fluid returns to the sump.

Referring now to FIG. 6, this embodiment works in a slightly different manner than that of FIGS. 2-4. Although the port 210 is eclipsed by the inner periphery 194 in FIG. 6, as in FIG. 3, and thus blocked from communication with any chamber, the port 230 remains in communication with the third chamber 208. The first and third chambers 140 and 208 thus continue to apply equal clamping forces during the moment of this eclipse.

Once the port 210 shifts to the right past its eclipsed position and into communication with the second chamber 206, which is the position illustrated in FIG. 7, the pressure between the second and third chambers 206 and 208 is again essentially equalized. The chamber 206 would remain pressurized through the port 210 because pressure continues to be applied to the third chamber 208 through the port 230. The fluid within the second chamber 206 would be pressurized to provide a counter-acting hydraulic force.

When the sheave flange 124 is at its high-ratio limit of travel, as shown in FIG. 7, a clamping force is applied by supplying fluid to the chamber 140, as in the embodiment of FIGS. 2 through 4. Fluid is vented to the balance can through orifice 236, which builds pressure in the chamber 206.

Figure 8:
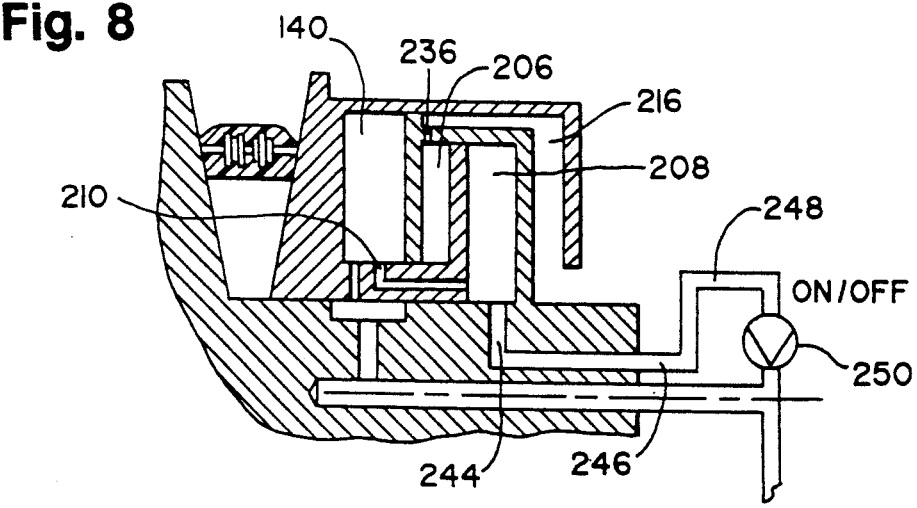
FIG. 8 is a schematic half-sectional detail view, taken through the center axis of the secondary sheave servo of another alternative embodiment of the present invention, configured to provide an intermediate transmission ratio.

Referring now to FIG. 8, another embodiment is illustrated. This embodiment omits the port 210, which provides inter-chamber communication. The port 230 of FIGS. 5 through 7 is replaced by a radial port 244 and an axial port 246 which connect the third chamber 208 to an externally regulated valve 250 by a fluid path or conduit schematically indicated at 248. When a substantial clamping force is necessary, as during launch, the valve 250 is opened, and the servo functions the same here as in previously described embodiments. After launch, or alternately after the torque converter is locked up, the valve 250 is shifted to allow communication between the third chamber 208 and a release vent, thus reducing the fluid pressure in the chamber 208. The second chamber 206 is filled with fluid to provide the centrifugal balance force, along with the balance can 216.

Figure 9:
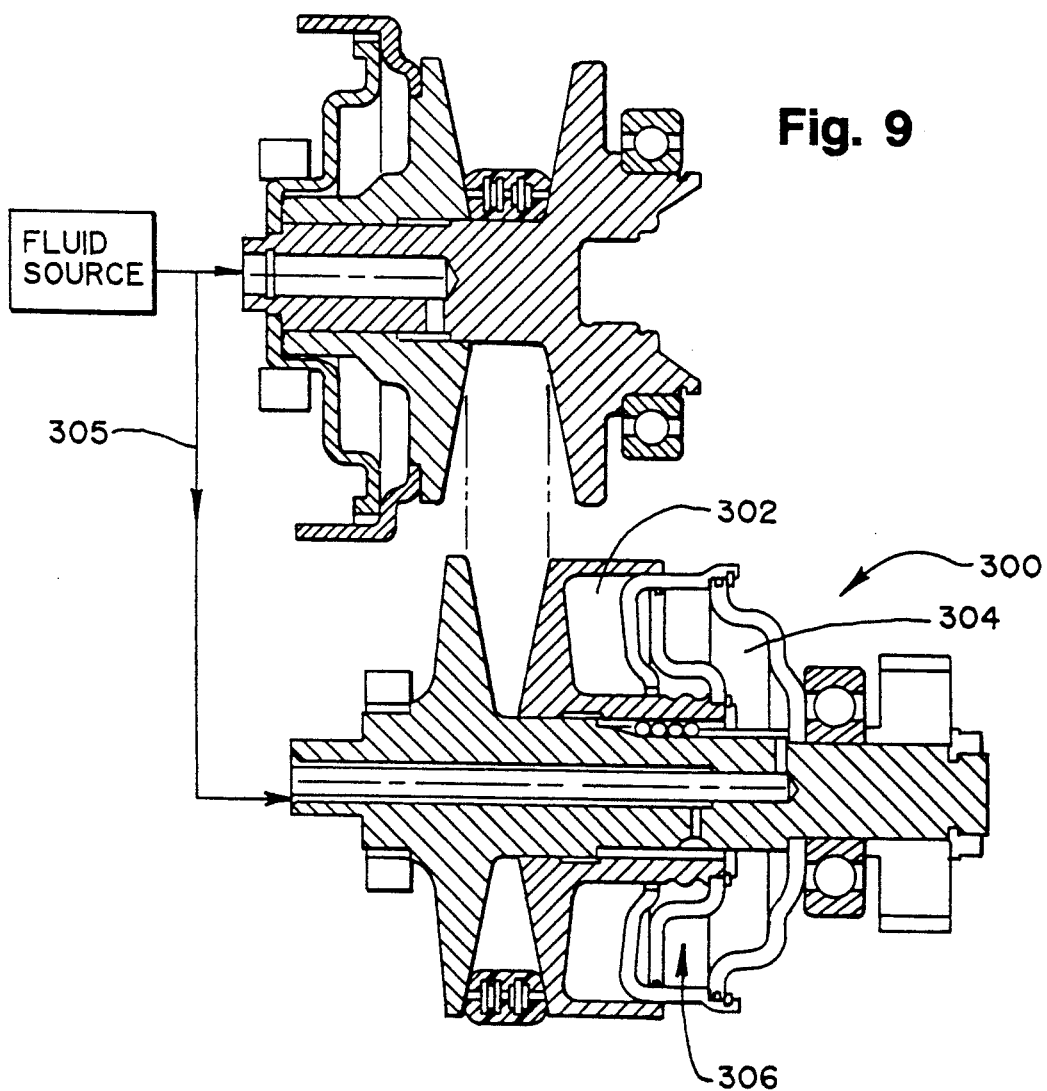
FIG. 9 is a sectional view, taken through the center axis of the primary and secondary sheave servos of another alternative embodiment.

Referring now to FIG. 9, another alternative embodiment is shown. FIG. 9 illustrates both the primary and secondary servos for the CVT. The belt and servos are illustrated in the high and low ratio conditions. The secondary servo, illustrated generally at 300, includes first and third fluid chambers 302 304, for application of clamping pressure. The first and third chambers provide the necessary clamping force for the low ratio condition, as previously described for the other embodiments.

A balance cavity 306, or second fluid chamber, provides a fluid reservoir for the high ratio conditions. A fluid connection 305 is provided between the fluid supply to the primary servo and the balance cavity 306. The fluid connection can comprise either a tubular connection or a series of conduits for fluid passage within the transmission casing, as used in the art for fluid passage. The fluid connection provides communication with the hydraulic source.

Fluid at primary pressure is piped directly to the balance cavity through the fluid connection 305. At stall conditions, or start-up, no pressure is fed to the primary, as the primary pulley is at its smallest pitch diameter. Since pressure is not being fed to the primary, pressure is also not being fed to the balance cavity through conduit 305, which allows the maximum clamping force on the secondary.

As the transmission ratio increases from the stall condition, the torque converter is locked and fluid pressure is fed to the primary sheave to provide an upshift to higher ratios of the CVT. As pressure is fed to the primary to provide the upshift, fluid pressure is also being fed to the balance cavity, which reduces the secondary clamping force. As the transmission is then downshifted, the secondary clamping force increases as the primary pressure decreases.

Thus, the embodiment of FIG. 9 controls the pressure to the balance cavity by utilizing the pressure to the primary. This embodiment provides the high clamping forces of the double area secondary servo along with more direct control of the fluid pressure in the balance cavity.

Figure 10A:
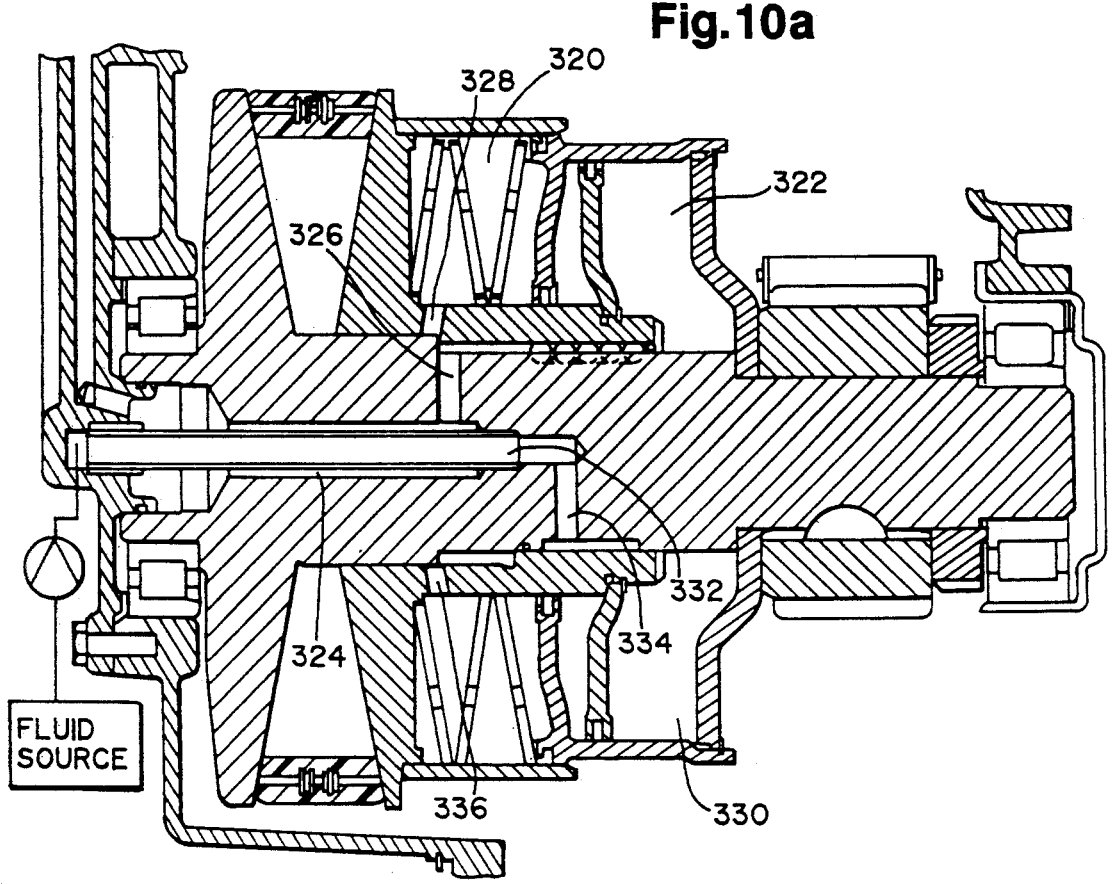
FIG. 10 is a sectional view taken through the center axis of the secondary servo of another alternative embodiment.
Figure 10B:
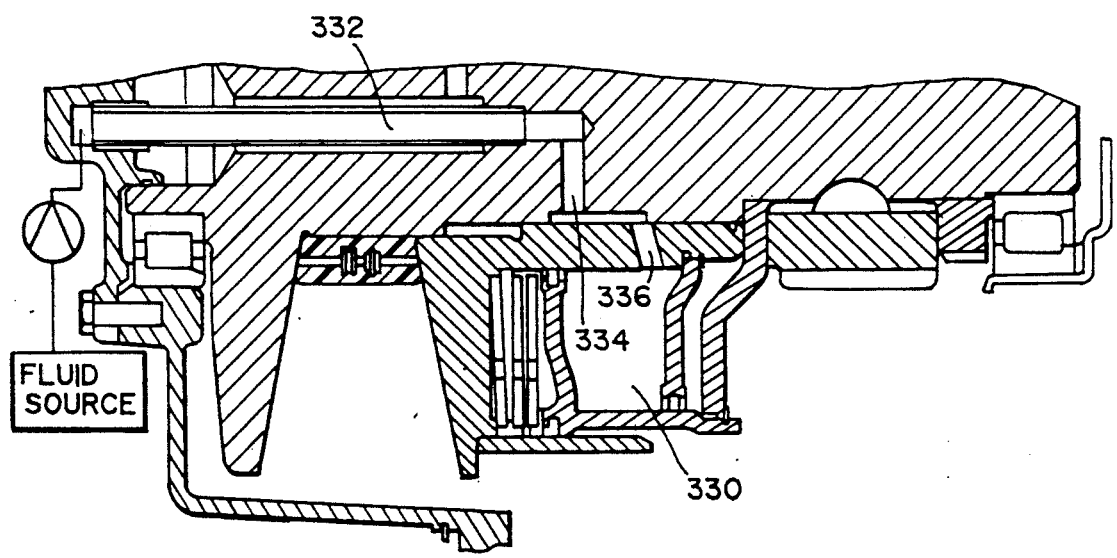

Another alternative embodiment is shown in FIG. 10. This Figure illustrates the secondary servo arrangement in the high and low ratio conditions. The two fluid chambers 320 and 322 apply the necessary clamping force, as previously described. Fluid is supplied to the chambers 320, 322 through the fluid conduit, illustrated as ports 324, 326, 328.

A constant fluid pressure is supplied to the balance cavity 330 through the fluid conduit illustrated as ports 332, 334, 336. Fluid to the conduit is controlled by a valve 340, shown only schematically in FIG. 10. The valve 340 is preferably located near the hydraulic supply or fluid source.

The constant pressure supplied to the balance cavity is controlled by the valve 340. When a decrease in secondary force is desired, such as during an upshift to a higher ratio, the valve is opened and the balance cavity is supplied with fluid. The pressure in the balance cavity then reacts against the pressure in the other two chambers 320, 322, to reduce the clamping force. When an increase in secondary force is desired, such as during a downshift to a lower ratio, the valve closed and the balance cavity 330 is left unpressurized, while fluid is added to the two apply chambers 320, 322. The second chamber acts as a centrifugal balance.

Figure 11:
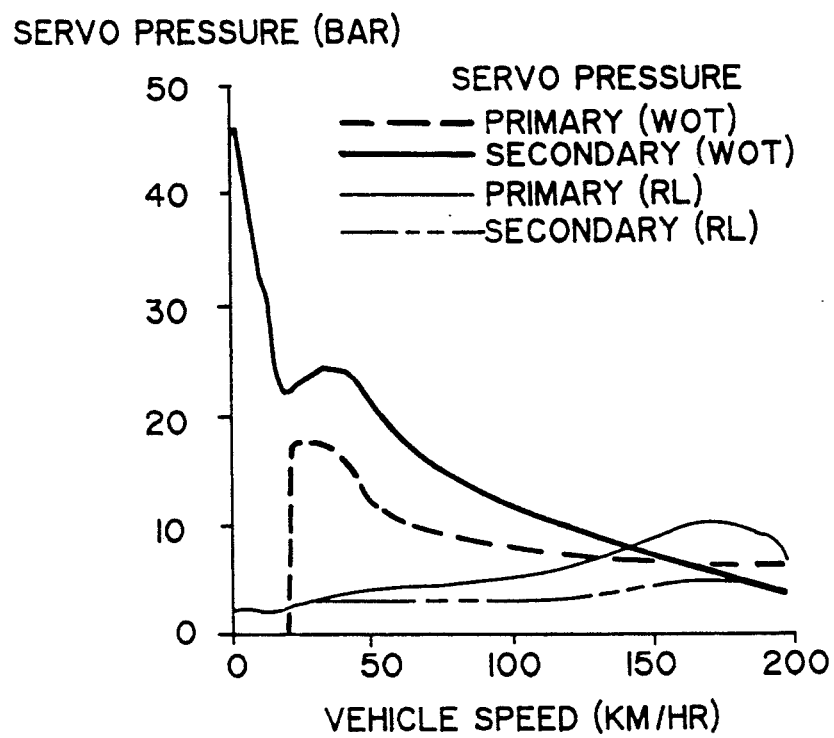
FIG. 11 is a graphical representation of primary servo fluid pressure and secondary servo fluid pressure (each in bars) plotted against vehicle speed (in km./hr.) for a conventional CVT in a motor vehicle; and, FIG. 12 is a graphical representation of primary servo fluid pressure and secondary servo fluid pressure (each in bars) versus vehicle speed (in km./hr.) for a CVT having a secondary servo configuration according to the present invention.
Figure 12:
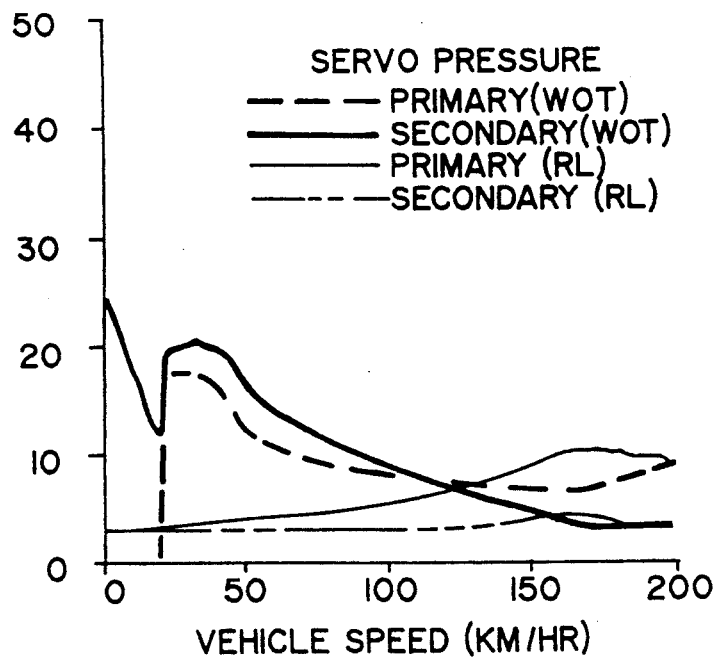

A graphical representation of the performance of the CVT with a torque converter of the present invention is shown in FIGS. 11 and 12. FIG. 11 represents the conventional CVT, while FIG. 12 shows the CVT of the present invention. These figures illustrate some of the benefits of the present invention in graphical form. Two plots on each figure represent the hydraulic fluid pressure in the primary and secondary servos of the CVT at wide-open throttle. The other plots in each instance represent the fluid pressure in the primary and secondary servos of the CVT at road load. These graphical representations are only representative of a sample plot with one embodiment of the CVT of the present invention and are not intended to demonstrate any particular results other than the generally expected behavior of the CVT of the present invention.

FIG. 11 shows that an extremely high fluid pressure—about 45 bars in this example—must be applied to the secondary servo at launch to provide an adequate belt clamping force in the secondary sheave. The necessary fluid pressure decreases rapidly, reaching a minimum at about 20 km/hr, as the vehicle speed increases while the CVT is in a low-ratio configuration. The minimum represents the point at which the torque converter is locked up. The declining plot from 0 to about 20 km/hr represents the decline in the torque multiplication provided by the torque converter as the vehicle speed increases.

From about 20 km/hr to about 40 km/hr, the engine is turning at a relatively high RPM while the CVT of FIG. 1 has not shifted from its low-ratio configuration. The torque of the engine is high at this speed, so the necessary clamping force increases in this range to a relatively flat maximum value. To the right of this maximum value, the necessary fluid pressure in the secondary servo decreases steadily as the CVT shifts from its low ratio configuration to its high ratio configuration.

The primary servo fluid pressure is zero from 0 km/hr to about 20 km/hr, since the primary sheave flanges are then against stops which act against the force on the belt created by the secondary. The primary servo is pressurized to its maximum value at about 20 km/hr. This change soon causes the CVT to begin shifting from its low-ratio configuration to its high ratio configuration. Less primary pressure is needed to continue this shift than to begin it, and even less pressure is required in the primary servo to prevent the CVT ratio from down-shifting from its high ratio configuration at high speed, so the primary pressure drops off as the speed of the vehicle increases.

The CVT of FIG. 12, in contrast to the conventional CVT of FIG. 11, does not require a high secondary servo pressure at launch. The secondary servo pressure at launch for the CVT of FIG. 12 is only about 24 bars, which means that a pump having half the pressure capacity of the pump used in the vehicle represented in FIG. 11 can be used in the vehicle represented in FIG. 12. This is possible because the secondary servo fluid pressure in the embodiment of FIG. 12 acts on approximately twice the servo piston area as the secondary servo fluid pressure in the embodiment of FIG. 11.

In the embodiment of FIG. 12, centrifugal force acts in all three of the chambers, each having about the same piston area and radius, and the second acting in opposition to the first and third. The net centrifugal force applied in the second and third chambers approximately cancels, so the servo of the embodiment of FIG. 12 provides only about the same effective centrifugal clamping force as the solitary servo chamber of FIG. 11.

To summarize, a CVT has been illustrated which is capable of supplying a high output torque at launch, and which also clamps its belt or other rotating member in its secondary sheave with just enough force to assure that the belt will not slip under a full range of operating conditions. The CVT has a low enough transmission ratio to allow a vehicle to move very slowly with acceptable wheel torque at a practical engine speed, and a high enough maximum transmission ratio that the vehicle can travel efficiently at a high rate of speed. The undesired centrifugal force causing a pressure increase in the rotating hydraulic sheave servos at high speeds has been moderated by applying a counteracting fluid pressure in the balance cavity or by reducing the effective area of the secondary servo. These results are accomplished in a single pass CVT.

While the preferred embodiment of this invention is illustrated, it will be understood that the invention is not limited to the illustrated embodiments. Those skilled in the art to which the invention pertains may make modifications and other embodiments employing the principles of the invention, particularly upon considering the foregoing teachings.

What is claimed is:

1. A continuously variable transmission system to provide transmission of torque from a torque input means to a torque output means, comprising:

rotatable input and output shafts;
   drive means for drivingly coupling said input shaft with said output shaft, said drive means including a first variable pulley rotatable with said input shaft, a second variable pulley rotatable with said output shaft, and a belt means coupling said first and second variable pulleys, each of said first and second variable pulleys having a fixed sheave and a movable sheave;
   first biasing means for continuously biasing together said fixed and movable sheaves of said first variable pulley, second biasing means for continuously biasing together said fixed and movable sheaves of said second variable pulley; and
   said second biasing means including a plurality of fluid chambers having fluid access to a source of pressurized hydraulic fluid, said plurality of fluid chambers including first, second and third fluid chambers, said first chamber being in fluid communication with said hydraulic fluid source, addition and exhaustion of fluid from said fluid chambers being effective to cause relative movement of said movable sheaves,
   said movable sheave of said second variable pulley being operatively positioned for movement from a first position to said second position corresponding to movement from a position proximate to a position distal from said fixed sheave of said second variable pulley,
   said movable sheave of said second variable pulley including a first fluid conduit, positioning of said movable sheave in said first position being effective to permit communication of fluid between said first fluid chamber and said third fluid chamber through said first fluid conduit.

2. The continuously variable transmission of claim 1 wherein said movable sheave includes a first fluid conduit, positioning of said movable sheave in said second position being effective to permit communication of fluid between said second fluid chamber and said third fluid chamber through said first fluid conduit.

3. The continuously variable transmission of claim 1 wherein said first fluid chamber has a first interior surface which is integral with said fixed sheave and a second interior surface which is integral with said movable sheave, translation of said movable sheave being effective to alter the volume of said first fluid chamber by translation of said first and second interior surfaces.

4. The continuously variable transmission of claim 2 wherein each of said first, second and third fluid chambers has a first interior surface which is integral with said fixed sheave and a second interior surface which is integral with said movable sheave, translation of said movable sheave being effective to alter the volume of each of said first, second and third fluid chambers by translation of each of said first and second interior surfaces.

5. The Continuously variable transmission of claim 3 wherein said movable sheave has a sleeve extending from said movable sheave, said extending sleeve having a surface defining an interior surface of said first fluid chamber 6. The continuously variable transmission of claim 1 wherein a second fluid conduit comprises said communication between said first fluid chamber and said hydraulic fluid source, and a third fluid conduit permits communication between said third fluid chamber and said hydraulic fluid source.

7. The continuously variable transmission of claim 6 wherein positioning said movable sheave in said second position being effective to prohibit communication between said third fluid chamber and said hydraulic fluid source through said third fluid conduit.

8. The continuously variable transmission of claim 6 wherein said third fluid conduit includes a valve means for regulation of fluid flow through said third fluid conduit.

* * * * *

UNITED STATES PATENT AND TRADEMARK OFFICE
CERTIFICATE OF CORRECTION

PATENT NO.  : 5,180,339
DATED       : January 19, 1993
INVENTOR(S) : William J. Haley et al.

It is certified that error appears in the above-indentified patent and that said Letters Patent is hereby corrected as shown below:

In column 1, line 51, delete "A" and substitute --As--.

In column 10, lines 53-54, after "embodiment" insert --illustrating different ratios in 10a and 10b--.

In column 10, lines 58-59, delete "This embodiment omits the port 210, which provides inter-chamber communication.--.

In column 11, line 11, delete "302 304" and substitute --302, 304"

Column 14,
In claim 5, line 5, after "chamber" insert --.--.

Signed and Sealed this

Ninth Day of April, 1996

Attest:

BRUCE LEHMAN

*Attesting Officer*   Commissioner of Patents and Trademarks